(12) United States Patent
Kumamoto

(10) Patent No.: US 7,449,838 B2
(45) Date of Patent: Nov. 11, 2008

(54) BACKLIGHT DEVICE AND DISPLAY UNIT PROVIDED WITH IT

(75) Inventor: Yasuhiro Kumamoto, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 491 days.

(21) Appl. No.: 10/571,059

(22) PCT Filed: Sep. 9, 2004

(86) PCT No.: PCT/JP2004/013476

§ 371 (c)(1),
(2), (4) Date: Mar. 8, 2006

(87) PCT Pub. No.: WO2005/027590

PCT Pub. Date: Mar. 24, 2005

(65) Prior Publication Data

US 2007/0024570 A1 Feb. 1, 2007

(30) Foreign Application Priority Data

Sep. 12, 2003 (JP) ............................. 2003-321387

(51) Int. Cl.
*G09G 3/10* (2006.01)

(52) U.S. Cl. ................. 315/169.1; 315/169.4; 315/312; 315/318; 345/102; 345/94; 345/87

(58) Field of Classification Search .............. 315/169.1, 315/169.3, 169.4, 312, 318; 345/87, 94, 345/102, 96, 99

See application file for complete search history.

(56) References Cited

U.S. PATENT DOCUMENTS

| 6,414,660 | B1 | 7/2002 | Kasahara et al. |
| 6,417,833 | B1 | 7/2002 | Takemoto |
| 6,441,803 | B1 | 8/2002 | Kasahara et al. |
| 6,466,195 | B1 * | 10/2002 | Hashimoto et al. .......... 345/102 |
| 6,492,965 | B2 | 12/2002 | Kasahara et al. |
| 6,509,884 | B2 | 1/2003 | Kasahara et al. |
| 6,661,181 | B2 * | 12/2003 | Shin ........................ 315/169.4 |
| 7,321,353 | B2 * | 1/2008 | Tsuda et al. .................. 345/99 |
| 2002/0130628 | A1 | 9/2002 | Shin |
| 2005/0140634 | A1 * | 6/2005 | Takatori ....................... 345/96 |

FOREIGN PATENT DOCUMENTS

| JP | 3293592 | 4/2002 |
| JP | 2002-231034 | 8/2002 |
| KR | 2002-0061834 | 7/2002 |

OTHER PUBLICATIONS

English language abstract of JP 2000-352718.
English language abstract of JP 2002-231034.
English language Abstract of KR 2002-0061834.

* cited by examiner

*Primary Examiner*—Haissa Philogene
(74) *Attorney, Agent, or Firm*—Greenblum & Bernstein, P.L.C.

(57) ABSTRACT

A backlight device is configured from a drive unit and a backlight. The backlight includes a first light source group and a second light source group. The drive unit drives one or more fluorescent lamps of the first light source group in response to a first synchronous signal, and drives one or more fluorescent lamps of the second light source group in response to a second synchronous signal. A phase difference between the first synchronous signal and the second synchronous signal is within a range greater than 60 degrees and smaller than 120 degrees, or a range greater than 240 degrees and smaller than 300 degrees.

19 Claims, 14 Drawing Sheets

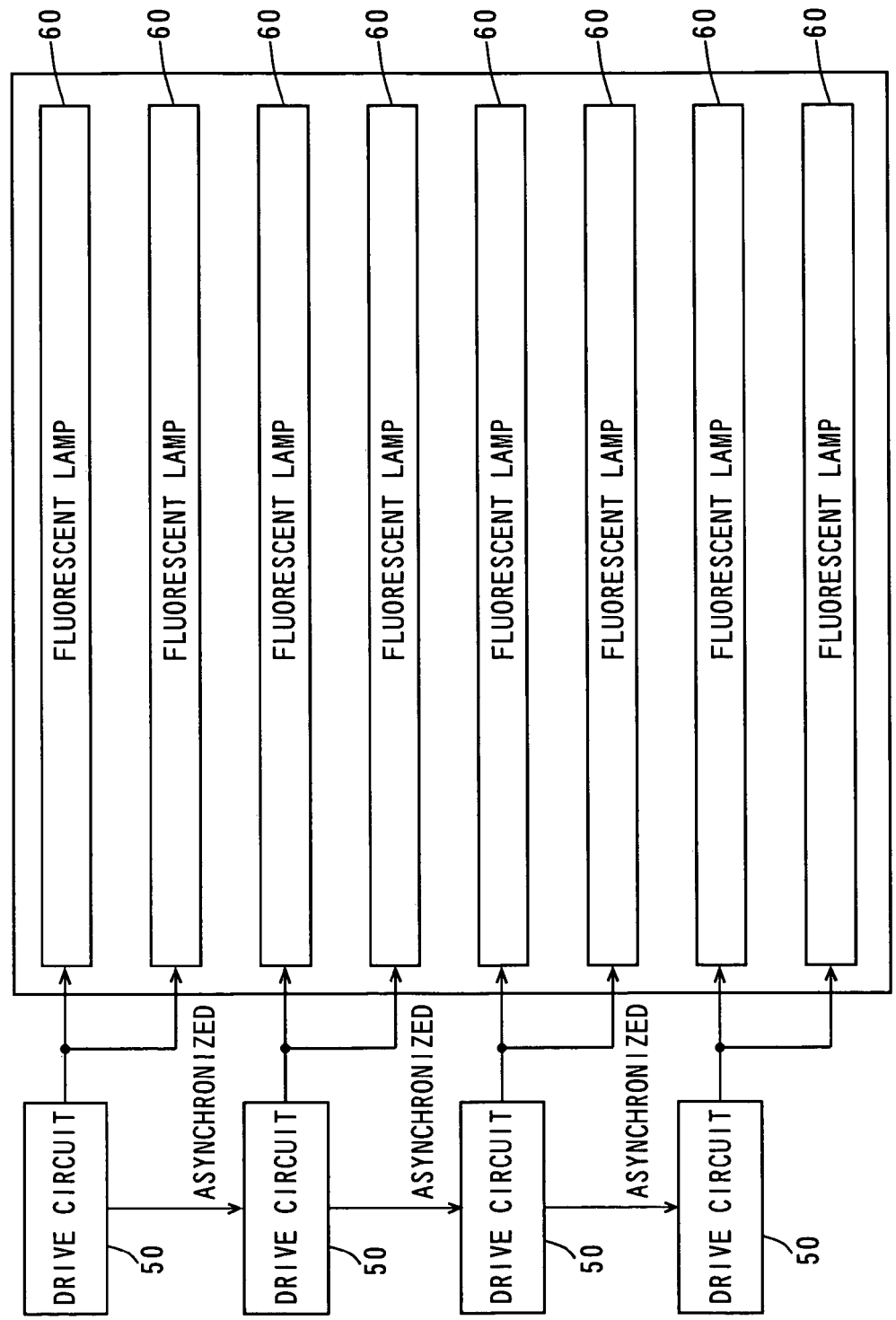

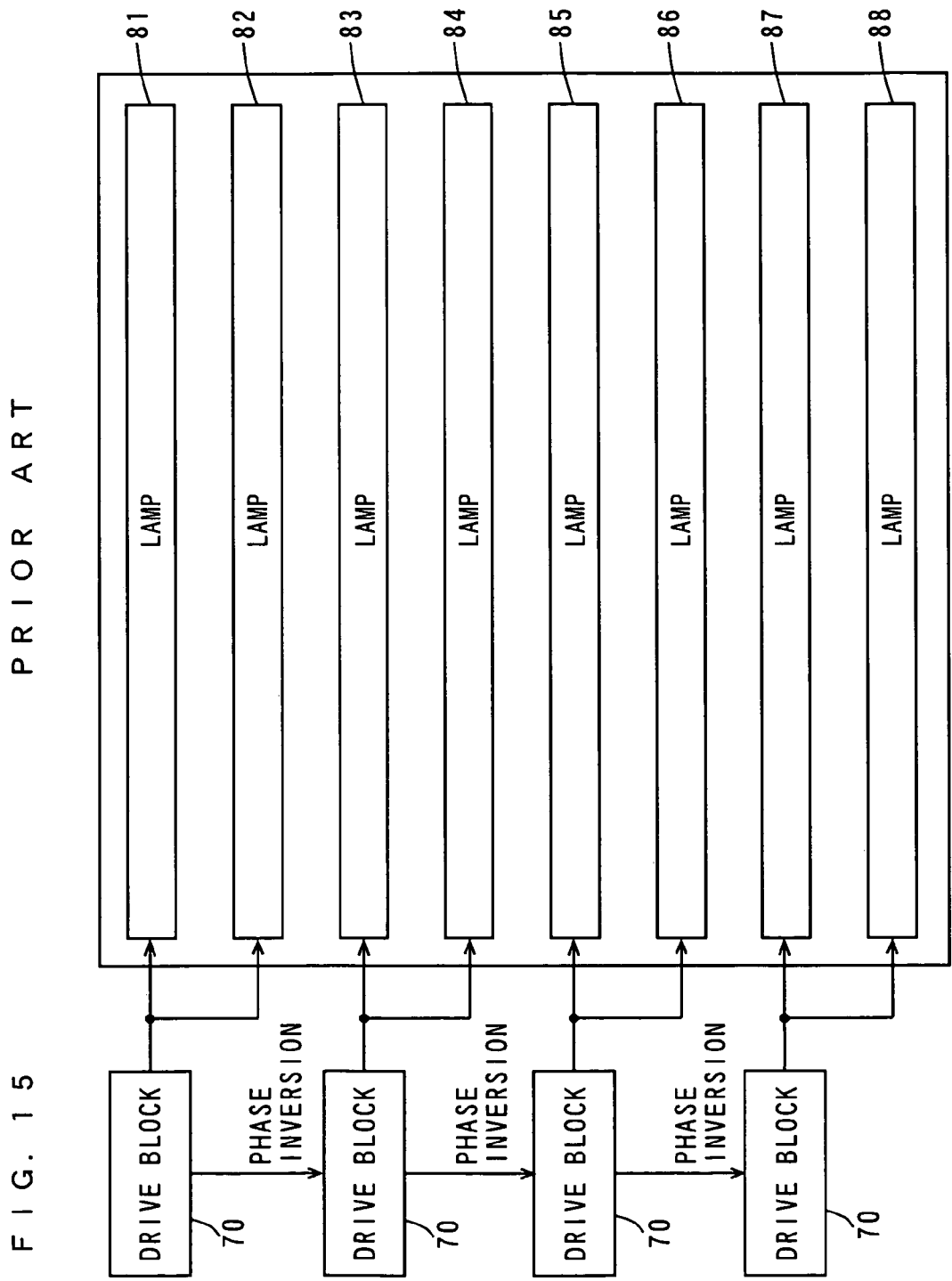

BACKLIGHT DEVICE AND DISPLAY UNIT
PROVIDED WITH IT

TECHNICAL FIELD

The present invention relates to a backlight device and a display device having the same.

BACKGROUND ART

In recent years, expectations for a PDP (plasma display panel) and a liquid crystal display device have been increased as a thin display device that replaces a CRT (cathode-ray tube). In particular, the liquid crystal display device is excellent in thinness and lightness, lower power consumption and the like, and is expected to be in increasing demand hereafter.

The display of the liquid crystal display device is performed by utilizing a light source referred to as a backlight device arranged on the back side of a liquid crystal panel. Liquid crystals in the liquid crystal display device themselves do not emit light, and the luminance of the liquid crystal display device largely depends on the amount of light emitted from the backlight device.

FIG. 14 is a block diagram showing an example of a conventional backlight device. The backlight device of FIG. 14 includes a plurality of drive circuits 50 and a plurality of fluorescent lamps 60, each drive circuit 50 being connected to two of the fluorescent lamps 60.

Each drive circuit 50 supplies a drive voltage to the fluorescent lamps 60 respectively connected thereto. By this, the respective fluorescent lamps 60 light up.

Here, in the backlight device of FIG. 14, the drive circuits 50 are controlled independently, and the drive voltages supplied from the respective drive circuits 50 to the corresponding fluorescent lamps 60 are asynchronous. Therefore, although the two fluorescent lamps 60 connected to the same drive circuit 50 light synchronously, the fluorescent lamps 60 connected to different drive circuits 50 light asynchronously.

In the liquid crystal display device using the above-described backlight device, when the number of the fluorescent lamps 60 increases, interference noise by the plurality of fluorescent lamps 60 is caused on the liquid crystal panel.

A method that solves the above-mentioned problem is disclosed in JP 3293592 B.

As shown in FIG. 15, a backlight display device according to JP 3293592 B includes a plurality of drive blocks 70 and a plurality of lamps 81 to 88, where two of the fluorescent lamps 81-88 are connected to each drive block 70. In the backlight display device of FIG. 15, the lamps are driven such that an oscillation waveform of the lamps 83, 84 is in opposite phase to an oscillation waveform of the lamps 81, 82, an oscillation waveform of the lamps 85, 86 is in opposite phase to the oscillation waveform of the lamps 83, 84, and an oscillation waveform of the lamps 87, 88 is in opposite phase to the oscillation waveform of the lamps 85, 86. By this, the interference noise by the plurality of lamps 81 to 88 can be cancelled.

However, in the above-described liquid crystal display device of JP 3293592 B, when operating a remote controlling equipment having a transmitter and a receiver that respectively transmits and receives an infrared signal of a high-frequency band (approximately 30 kHz to approximately 60 kHz) near the liquid crystal display device, malfunction occurs in the receiver of the remote controlling equipment. Here, the transmitter of the remote controlling equipment is, for example, a remote control for operating the liquid crystal display device, and the receiver is, for example, an infrared-ray receiving sensor IC (integrated circuit) installed in the main body of the liquid crystal display device.

DISCLOSURE OF INVENTION

An object of the present invention is to provide a backlight device capable of reducing malfunction of equipment utilizing an infrared signal and a display device having the same.

A backlight device according to one aspect of the present invention comprises a first light source group including one or more light sources that emit visible light and infrared rays, a second light source group including one or more light sources that emit visible light and infrared rays, and a drive unit that drives the one or more light sources of the first light source group in response to a first synchronous signal and drives the one or more light sources of the second light source group in response to a second synchronous signal, and a phase difference between the first synchronous signal and the second synchronous signal is within a range larger than 60 degrees and smaller than 120 degrees or a range larger than 240 degrees and smaller than 300 degrees.

In the backlight device, the one or more light sources of the first light source group is driven in response to the first synchronous signal and the one or more light sources of the second light source group is driven in response to the second synchronous signal. By this, the visible light and infrared rays are emitted from the one or more light sources of the first light source group and the visible light and infrared rays are emitted from the one or more light sources of the second light source group. As a result, a waveform of the intensity of the infrared rays emitted from the one or more light sources of the first light source group and a waveform of the intensity of the infrared rays emitted from the one or more light sources of the second light source group are synthesized.

In this case, the phase difference between the first synchronous signal and the second synchronous signal is within the range larger than 60 degrees and smaller than 120 degrees or the range larger than 240 degrees and smaller than 300 degrees. By this, the amplitude of the synthesized waveform of the intensity of the infrared rays is averaged, so that the level of a DC component is increased and the amplitude of an AC component is reduced. As a result, the effect on an infrared signal transmitted from other equipment is reduced and the malfunction of the other equipment is restrained.

Each of the one or more light sources of the first light source group and the one or more light sources of the second light source group may be a fluorescent lamp.

In this case, the waveform of the intensity of the infrared rays emitted from the one or more fluorescent lamps of the first light source group and the waveform of the intensity of the infrared rays emitted from the one or more fluorescent lamps of the second light source group are synthesized, so that the level of the DC component is increased and the amplitude of the AC component is reduced in the synthesized waveform of the intensity of the infrared rays. As a result, the effect on an infrared signal transmitted from other equipment is reduced and the malfunction of the other equipment is restrained.

The first light source group may include a plurality of light sources, and the drive unit may drive a part of the plurality of light sources of the first light source group in response to the first synchronous signal, and drive the rest of the plurality of light sources of the first light source group in response to a third synchronous signal having a phase different from that of the first synchronous signal by half a period.

In this case, the part of the plurality of light sources of the first light source group are driven in response to the first synchronous signal and the rest of the plurality of light sources of the first light source group are driven in response to the third synchronous signal having the phase different from that of the first synchronous signal by half a period. By this, noise caused from the part of the plurality of light sources of the first light source group and noise caused from the rest of the plurality of light sources of the first light source group cancel each other. As a result, noise on an image displayed on a display panel due to noise from the plurality of light sources is prevented from being caused.

The second light source group may include a plurality of light sources, and the drive unit may drive a part of the plurality of light sources of the second light source group in response to the second synchronous signal, and drive the rest of the plurality of light sources of the second light source group in response to a fourth synchronous signal having a phase different from that of the second synchronous signal by half a period.

In this case, the part of the plurality of light sources of the second light source group are driven in response to the second synchronous signal and the rest of the plurality of light sources of the second light source group is driven in response to the fourth synchronous signal having the phase different from that of the second synchronous signal by half a period. By this, noise caused from the part of the plurality of light sources of the second light source group and noise caused from the rest of the plurality of light sources of the second light source group cancel each other. As a result, noise on an image displayed on the display panel due to noise from the plurality of light sources is prevented from being caused.

The first light source group may include a plurality of light sources, the plurality of light sources of the first light source group may be divided into a plurality of first subgroups, and the plurality of first subgroups and the second light source group may be arranged alternately.

In this case, a distance between each of the light sources of the first light source group and each of the light sources of the second light source group becomes short, and thus, the waveform of the intensity of the infrared rays emitted from each of the light sources of the first light source group and the waveform of the intensity of the infrared rays emitted from each of the light sources of the second light source group are sufficiently synthesized. By this, the amplitude of the AC component in the synthesized waveform of the intensity of the infrared rays is surely reduced. As a result, the effect on the infrared signal transmitted from other equipment is surely reduced, and even when the other equipment is operated near the backlight device, the malfunction of the other equipment can be sufficiently restrained.

The second light source group may include a plurality of light sources, the plurality of light sources of the second light source group may be divided into a plurality of second subgroups, and the plurality of first subgroups and the second subgroups may be arranged alternately.

In this case, the distance between each of the light sources of the first light source group and each of the light sources of the second light source group becomes shorter, and thus, the waveform of the intensity of the infrared rays emitted from each of the light sources of the first light source group and the waveform of the intensity of the infrared rays emitted from each of the light sources of the second light source group are more sufficiently synthesized. By this, the amplitude of the AC component in the synthesized waveform of the intensity of the infrared rays is more surely reduced. As a result, the effect on the infrared signal transmitted from other equipment is more surely reduced, and even when the other equipment is operated near the backlight device, the malfunction of the other equipment can be more sufficiently restrained.

The phase difference between the first synchronous signal and the second synchronous signal may be within a range of 75 degrees to 105 degrees or a range of 255 degrees to 285 degrees.

In this case, the level of the DC component is further increased and the amplitude of the AC component is further reduced in the synthesized waveform of the intensity of the infrared rays. As a result, the effect on the infrared signal transmitted from other equipment is further reduced, and the malfunction of the other equipment is further restrained. In addition, since a malfunction duration time comes in a start-up sequence of a display device with the backlight device, the display device, substantially, does not malfunction.

The phase difference between the first synchronous signal and the second synchronous signal may be substantially 90 degrees or 270 degrees.

In this case, the level of the DC component is increased most and the amplitude of the AC component is reduced most in the synthesized waveform of the intensity of the infrared rays. As a result, the effect on the infrared signal transmitted from other equipment is reduced most, and the malfunction of the other equipment is sufficiently restrained.

The drive unit may include a first drive circuit that applies a first drive voltage to the one or more light sources of the first light source group synchronously with the first synchronous signal, and a second drive circuit that applies a second drive voltage to the one or more light sources of the second light source group synchronously with the second synchronous signal.

In this case, the first drive voltage is applied to the one or more light sources of the first light source group synchronously with the first synchronous signal, and the second drive voltage is applied to the one or more light sources of the second light source group synchronously with the second synchronous signal.

The phase difference between the first drive voltage and the second drive voltage is within a range larger than 60 degrees and smaller than 120 degrees or a range larger than 240 degrees and smaller than 300 degrees. By this, the level of the DC component is increased and the amplitude of the AC component is reduced in the synthesized waveform of the intensity of the infrared rays. As a result, the effect on the infrared signal transmitted from other equipment is reduced, and the malfunction of the other equipment is restrained.

The drive unit may further include a first signal generating circuit that generates the second synchronous signal based on the first synchronous signal.

In this case, the second synchronous signal having the above-described phase difference relative to the first synchronous signal is generated based on the first synchronous signal.

The drive unit may include a first drive circuit that applies a first drive voltage to the part of the plurality of light sources of the first light source group synchronously with the first synchronous signal, a second drive circuit that applies a second drive voltage to the one or more light sources of the second light source group synchronously with the second synchronous signal, and a third drive circuit that applies a third drive voltage to the rest of the plurality light sources of the first light source group synchronously with the third synchronous signal.

In this case, the first drive voltage is applied to the part of the plurality of the light sources of the first light source group synchronously with the first synchronous signal and the second drive voltage is applied to the one or more light sources of the second light source group synchronously with the second synchronous signal. Further, the third drive voltage is applied to the rest of the plurality of light sources of the first light source group synchronously with the third synchronous signal.

The phase difference between the first drive voltage and the second drive voltage is within a range larger than 60 degrees and smaller than 120 degrees or a range larger than 240 degrees and smaller than 300 degrees. By this, the level of the DC component is increased and the amplitude of the AC component is reduced in the synthesized waveform of the intensity of the infrared rays. As a result, the effect on the infrared signal transmitted from other equipment is reduced, and the malfunction of the other equipment is restrained.

Furthermore, the phase of the first drive voltage and the phase of the third drive voltage are shifted from each other by half a period. By this, noise caused from the part of the plurality of light sources of the first light source group and noise caused from the rest of the plurality of light sources of the first light source group cancel each other.

The drive unit may further include a first signal generating circuit that generates the second synchronous signal based on the first synchronous signal, and a second signal generating circuit that generates the third synchronous signal based on the first synchronous signal.

In this case, the second synchronous signal having the above-described phase difference relative to the first synchronous signal is generated based on the first synchronous signal. Furthermore, the third synchronous signal having a phase different from that of the first synchronous signal by half a period is generated based on the first synchronous signal.

The drive unit may include a first drive circuit that applies a first drive voltage to the part of the plurality of light sources of the first light source group synchronously with the first synchronous signal, a second drive circuit that applies a second drive voltage to the part of the plurality of light sources of the second light source group synchronously with the second synchronous signal, a third drive circuit that applies a third drive voltage to the rest of the plurality of light sources of the first light source group synchronously with the third synchronous signal, and a fourth drive circuit that applies a fourth drive voltage to the rest of the plurality of light sources of the second light source group synchronously with the fourth synchronous signal.

In this case, the first drive voltage is applied to the part of the plurality of light sources of the first light source group synchronously with the first synchronous signal, and the second drive voltage is applied to the part of the plurality of light sources of the second light source group synchronously with the second synchronous signal. Furthermore, the third drive voltage is applied to the rest of the plurality of light sources of the first light source group synchronously with the third synchronous signal, and the fourth drive voltage is applied to the rest of the plurality of light sources of the second light source group synchronously with the fourth synchronous signal.

The phase difference between the first drive voltage and the second drive voltage is within a range larger than 60 degrees and smaller than 120 degrees or a range larger than 240 degrees and smaller than 300 degrees. Furthermore, the phase difference between the third drive voltage and the fourth drive voltage is within a range larger than 60 degrees and smaller than 120 degrees or a range larger than 240 degrees and smaller than 300 degrees. By this, the level of the DC component is increased and the amplitude of the AC component is reduced in the synthesized waveform of the intensity of the infrared rays. As a result, the effect on the infrared signal transmitted from other equipment is reduced, and the malfunction of the other equipment is restrained.

Furthermore, the phase of the first drive voltage and the phase of the third drive voltage are shifted from each other by half a period. By this, noise caused from the part of the plurality of light sources of the first light source group and noise caused from the rest of the plurality of light sources of the first light source group cancel each other. Moreover, the phase of the second drive voltage and the phase of the fourth drive voltage are shifted from each other by half a period. By this, noise caused from the part of the plurality of light sources of the second light source group and noise caused from the rest of the plurality of light sources of the second light source group cancel each other.

The drive unit may further include a first signal generating circuit that generates the second synchronous signal based on the first synchronous signal, a second signal generating circuit that generates the third synchronous signal based on the first synchronous signal, and a third signal generating circuit that generates the fourth synchronous signal based on the second synchronous signal.

In this case, the second synchronous signal having the above-described phase difference relative to the first synchronous signal is generated based on the first synchronous signal. Further, the third synchronous signal having a phase different from that of the first synchronous signal by half a period is generated based on the first synchronous signal. Moreover, the third synchronous signal having a phase different from that of the second synchronous signal by half a period is generated based on the second synchronous signal.

The number of the one or more light sources of the first light source group and the number of the one or more light sources of the second light source group may be equal.

In this case, the waveform of the intensity of the infrared rays emitted from each of the light sources of the first light source group and the waveform of the intensity of the infrared rays emitted from each of the light sources of the second light source group are sufficiently synthesized. By this, the amplitude of the AC component is surely reduced in the synthesized waveform of the intensity of the infrared rays. As a result, the effect on an infrared signal transmitted from other equipment is surely reduced and the malfunction of the other equipment is sufficiently restrained.

The one or more light sources of the first light source group and the one or more light sources of the second light source group may be straight tube lamps or L-shaped lamps.

In this case, the waveform of the intensity of the infrared rays emitted from the one or more straight tube lamps or L-shaped lamps of the first light source group and the waveform of the intensity of the infrared rays emitted from the straight tube lamps or L-shaped lamps of the second light source group are synthesized, and in the synthesized waveform of the intensity of the infrared rays, the level of the DC component is increased, and the amplitude of the AC component is reduced. As a result, the effect on an infrared signal transmitted from other equipment is reduced and the malfunction of other equipment is restrained.

A light guide plate may be further included, and in the straight tube lamps or L-shaped lamps may be arranged on the side of the light guide plate.

In this case, visible light and infrared rays generated by the straight tube lamps or the L-shaped lamps are emitted from the side of the light guide plate and are diffused by the light guide plate.

A display device according to another aspect of the present invention comprises a display panel that displays an image, and a backlight device arranged on the back side of the display panel, and the backlight device comprises a first light source group including one or more light sources that emit visible light and infrared rays, a second light source group including one or more light sources that emit visible light and infrared rays, and a drive unit that drives the one or more light sources of the first light source group in response to a first synchronous signal and drives the one or more light sources of the second light source group in response to a second synchronous signal, and a phase difference between the first synchronous signal and the second synchronous signal is within a range larger than 60 degrees and smaller than 120 degrees or a range larger than 240 degrees and smaller than 300 degrees.

In the display device, the visible light emitted from the backlight device irradiates a back surface of the display panel. In the backlight device, the one or more light sources of the first light source group is driven in response to the first synchronous signal, and the one or more light sources of the second light source group is driven in response to the second synchronous signal. By this, the visible light and the infrared rays are emitted from the one or more light sources of the first light source group and the visible light and the infrared rays are emitted from the one or more light sources of the second light source group. As a result, the waveform of the intensity of the infrared rays emitted from the one or more light sources of the first light source group and the waveform of the intensity of the infrared rays emitted from the one or more light sources of the second light source group are synthesized.

In this case, the phase difference between the first synchronous signal and the second synchronous signal is within the range larger than 60 degrees and smaller than 120 degrees or the range larger than 240 degrees and smaller than 300 degrees. By this, the amplitude of the synthesized waveform of the intensity of the infrared rays is averaged, so that the level of the DC component is increased and the amplitude of the AC component is reduced. As a result, the effect on an infrared signal transmitted from other equipment is reduced and the malfunction of the other equipment is restrained.

The display panel may be a liquid crystal display panel.

In this case, the visible light emitted from the backlight device irradiates a back surface of the liquid crystal display panel.

BRIEF DESCRIPTION OF DRAWINGS

FIG. 14 is a block diagram showing an example of a conventional backlight device; and FIG. 15 is a block diagram showing another example of a conventional backlight device.

BEST MODE FOR CARRYING OUT THE INVENTION

Hereinafter, embodiments of the present invention are described, with reference to FIGS. 1 to 13.

FIRST EMBODIMENT

Figure 1:
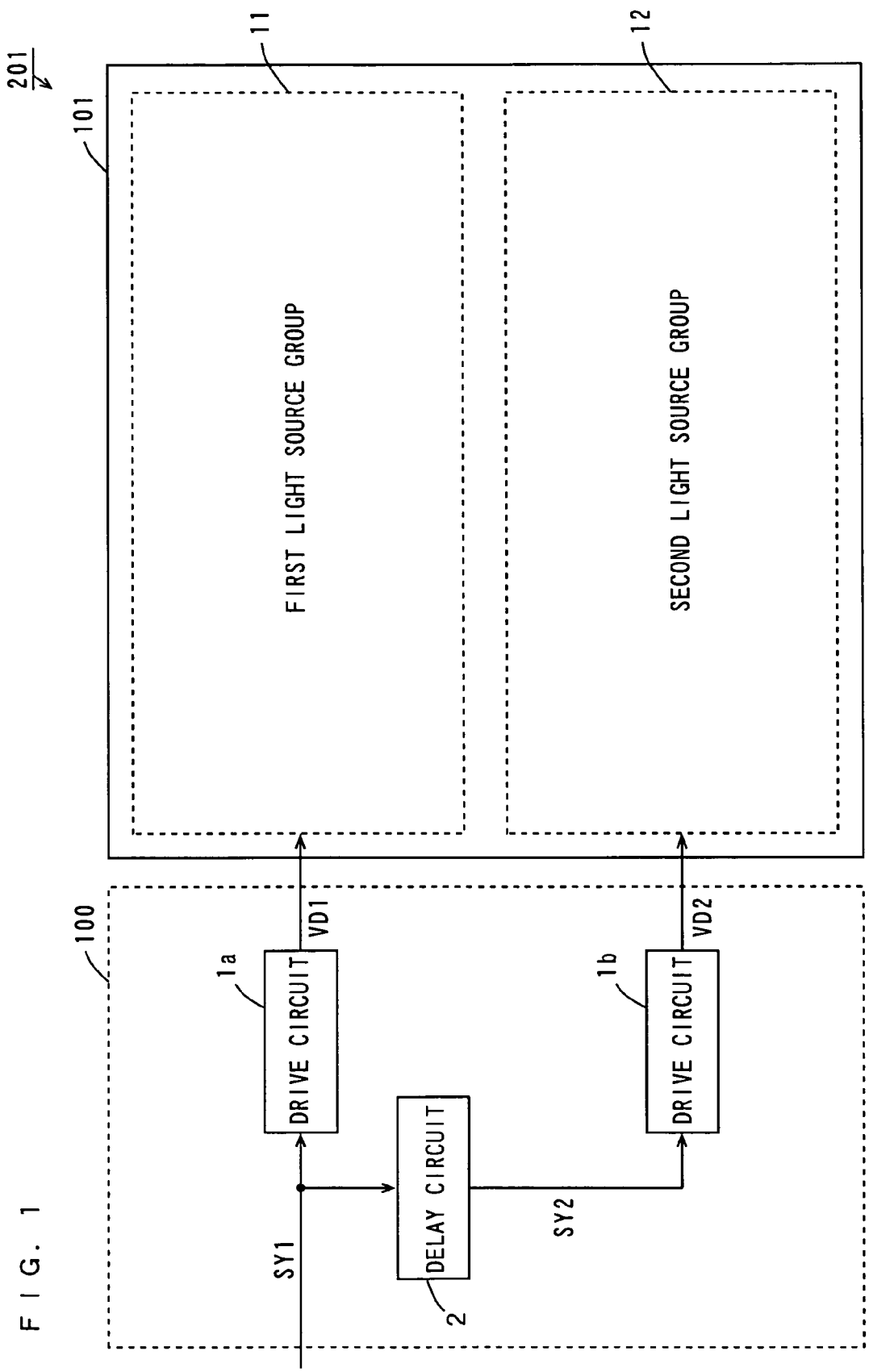
FIG. 1 is a block diagram showing a configuration of a backlight device according to a first embodiment of the present invention.
Figure 2:
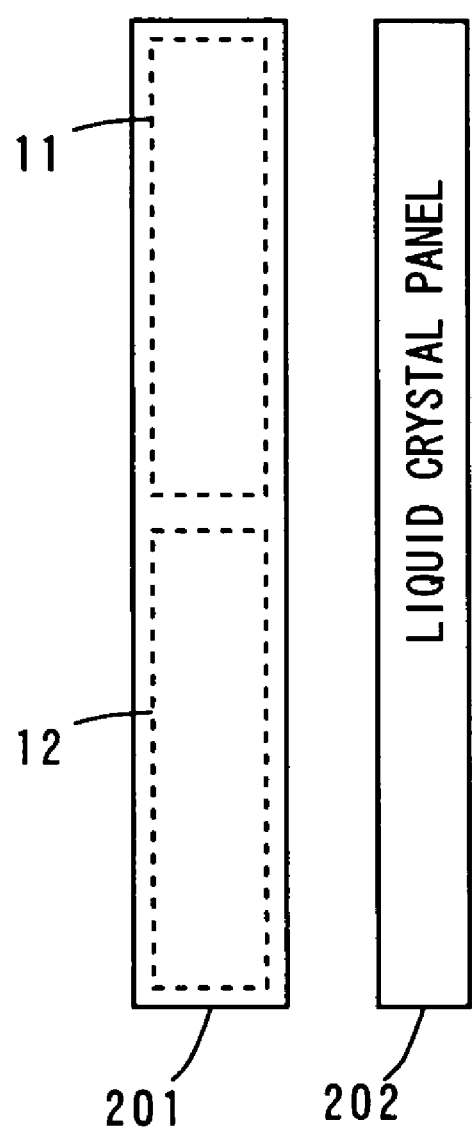
FIG. 2 is a schematic cross-section view of a liquid crystal display device using the backlight device of FIG. 1.

FIG. 1 is a block diagram showing a configuration of a backlight device according to a first embodiment of the present invention, and FIG. 2 is a schematic cross-section view of a liquid crystal display device using the backlight device of FIG. 1.

A backlight device 201 of FIG. 1 includes a drive unit 100 and a backlight 101. The drive unit 100 includes a drive circuit 1a, a drive circuit 1b and a delay circuit 2. The backlight 101 includes a first light source group 11 and a second light source group 12. The first and second light source groups are composed of one or a plurality of fluorescent lamps.

Furthermore, the liquid crystal display device of FIG. 2 has a configuration in which the backlight device 201 of FIG. 1 is arranged on the back side of a liquid crystal panel 202. The liquid crystal panel 202 performs display by using light from the backlight device 201.

The synchronous signal SY1 is supplied to the drive circuit 1a and the delay circuit 2 of FIG. 1. The drive circuit 1a supplies an AC drive voltage VD1 to the first light source group 11 synchronously with the synchronous signal SY1. By this, the first light source group 11 lights up.

Furthermore, the delay circuit 2 delays the phase of the synchronous signal SY1 as set in advance, and the delayed synchronous signal SY2 is supplied to the drive circuit 1b. The drive circuit 1b supplies an AC drive voltage VD2 to the second light source group 12 synchronously with the synchronous signal SY2. By this, the second light source group 12 lights up. Here, a phase difference between the synchronous signal SY1 and the synchronous signal SY2 is Δθ. This phase difference Δθ will be described later.

Generally, in addition to mercury atoms, a rare gas such as neon and argon is enclosed in the fluorescent lamps used in the backlight 101 as a buffering gas. Ultraviolet rays emitted from the mercury atoms (mainly bright lines of 257.3 nm) are converted to visible light by a fluorescent substance applied to an inner surface of the fluorescent lamp to be emitted outside. On the other hand, the rare gas is typically used to decrease the drive voltage at start time of lighting the fluorescent lamps and at the same time, emits red visible light and infrared rays.

While the amount of infrared radiation of the backlight 101 increases immediately after lighting, when the amount of infrared radiation from the rare gas is large, mercury light emission becomes dominant in the light emission of the fluorescent lamps and the amount of infrared radiation decreases over time.

From various experiments, the present inventor found a relationship between this amount of infrared radiation and malfunction of remote controlling equipment of the liquid crystal display device as follows. Here, the remote controlling equipment is equipment for operating the liquid crystal display device remotely and is composed of a transmitter that transmits an infrared signal and a receiver that receives the infrared signal.

Figure 3:
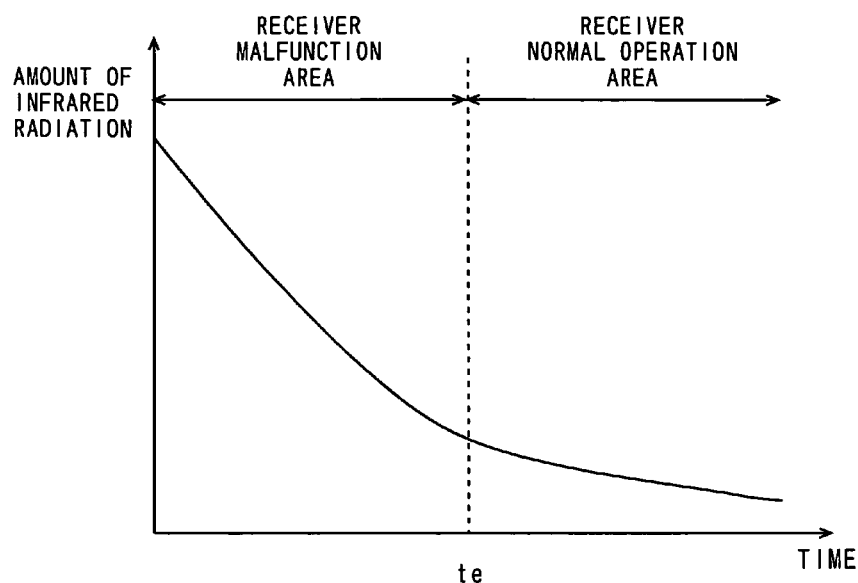
FIG. 3 is a chart explaining a relationship between an amount of infrared radiation of the backlight and malfunction of remote controlling equipment.

FIG. 3 is a chart for explaining the relationship between the amount of infrared radiation of the backlight 101 and the malfunction of the remote controlling equipment. In FIG. 3, the vertical axis indicates the amount of infrared radiation and the horizontal axis indicates time. Furthermore, in FIG. 3, a solid line indicates temporal change in the amount of infrared radiation of the backlight. As shown in FIG. 3, the amount of infrared radiation from the backlight 101 decreases from the start time of lighting the fluorescent lamps over time. The receiver of the remote controlling equipment malfunctions from the start of the lamp lighting in the backlight 101 to a time te after some time elapses, and thereafter, it operates normally. Hereinafter, the time te is referred to as a malfunction duration time. The malfunction duration time te changes depending on the amount of infrared radiation of the backlight 101 and the intensity of the infrared signal of the transmitter of the remote controlling equipment.

The present inventor found that the malfunction duration time te can be adjusted by selectively setting the phase difference $\Delta\theta$ in the backlight device 201 shown in FIG. 1. Hereinafter, a detailed description is given.

Figure 4:
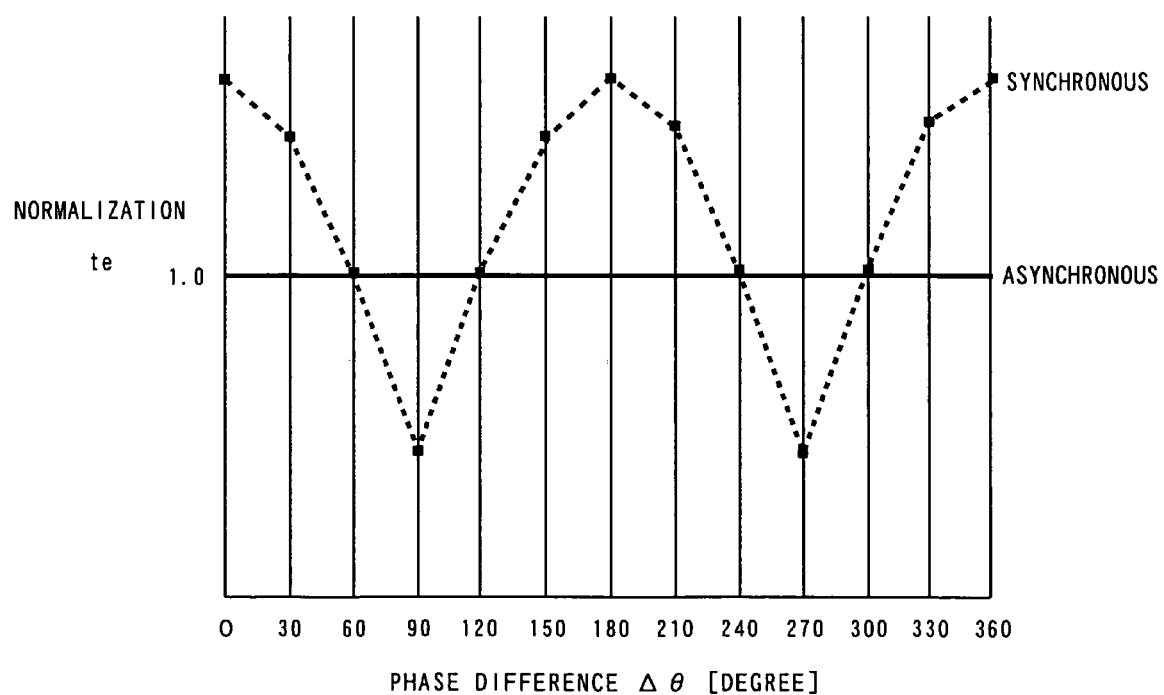
FIG. 4 is a chart showing change in malfunction end time te when a phase difference Δθ is changed from 0° to 360° in an increment of 30° in the backlight device of FIG. 1.

FIG. 4 is a chart showing the change in the malfunction duration time te when the phase difference $\Delta\theta$ is changed from 0° to 360° in an increment of 30° the backlight device 201 of FIG. 1. In FIG. 4, by defining, as 1, a value of the malfunction duration time te when the first light source group 11 and the second light source group 12 of the backlight device 201 of FIG. 1 light asynchronously, a value of the malfunction duration time te in each phase difference $\Delta\theta$ is normalized. A lighting frequency of the fluorescent lamps of the backlight device 201 is 48.1 kHz and a carrier frequency of the infrared signal of the transmitter of the remote controlling equipment is 36.7 kHz.

As shown in FIG. 4, the value of the malfunction duration time te changes periodically depending on the phase difference $\Delta\theta$, showing a maximal value when the phase difference $\Delta\theta$ is 0°, 180°, and 360° and a minimal value when the phase difference $\Delta\theta$ is 90° and 270°. Namely, when the phase difference $\Delta\theta$ is 0°, 180°, and 360°, the duration time of the malfunction of the receiver becomes the longest and when the phase difference $\Delta\theta$ is 90° and 270°, the duration time of the malfunction of the receiver becomes the shortest. Hereinafter, the reason why the malfunction duration time te changes depending on the variation in the phase difference $\Delta\theta$ is explained.

Figure 5:
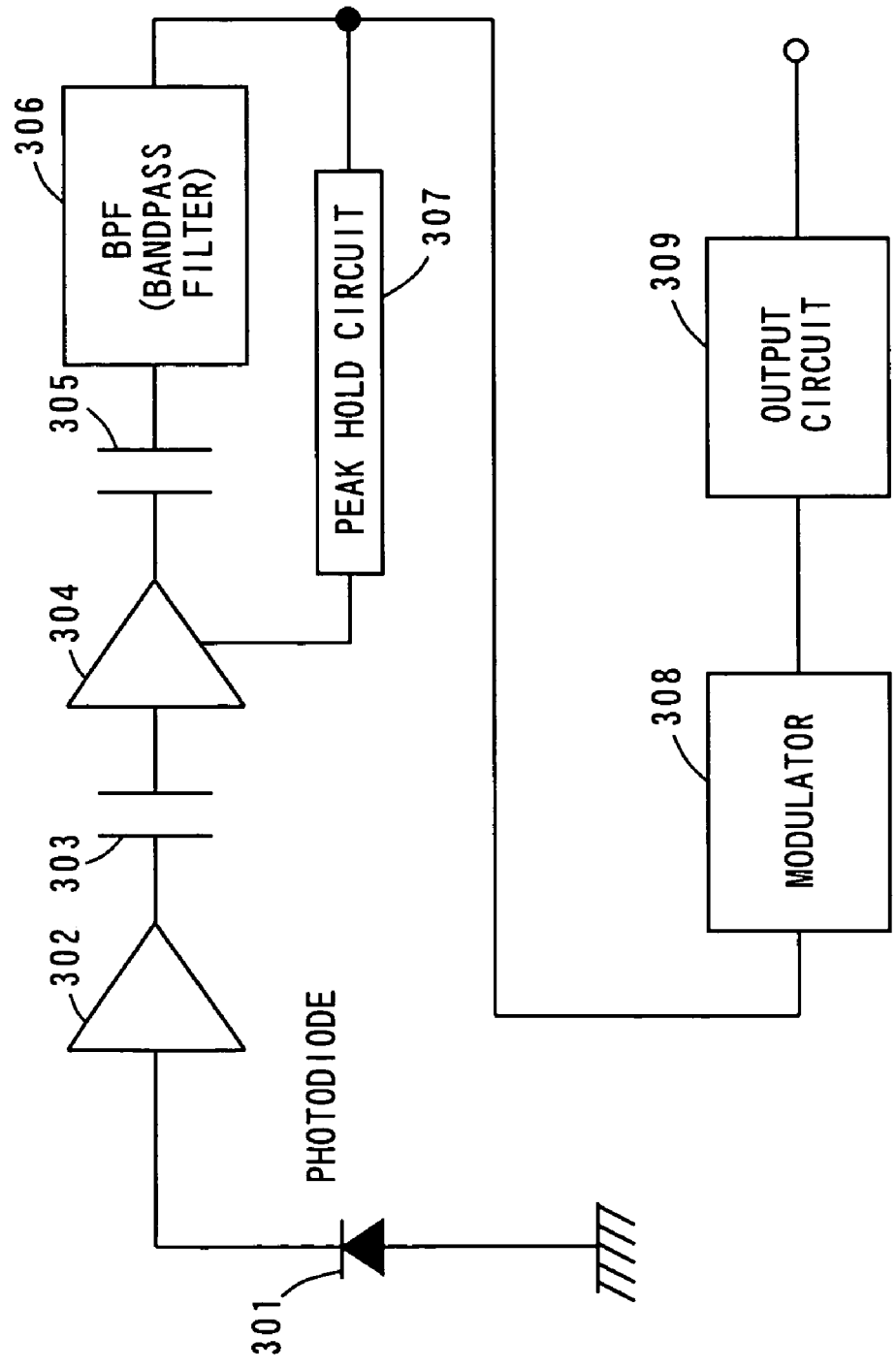
FIG. 5 is an internal block diagram of a receiving sensor IC.

FIG. 5 is an internal block diagram of a receiving sensor IC (integrated circuit) generally used as the receiver of the remote controlling equipment. The infrared signal transmitted from the transmitter of the remote controlling equipment is sensed by a photodiode 301 of the receiver and converted to an electrical signal. The electrical signal is amplified by an amplifier 302 and is supplied to an AGC (automatic gain control) amplifier 304 through a condenser 303 for removing a DC component. An output signal of the AGC amplifier 304 is supplied to a BPF (band-pass filter) 306 through a condenser 305 for removing a DC component. The BPF 306 allows a component of a frequency band including the carrier frequency of the infrared signal to pass and attenuates other frequency components largely. An output signal of the BPF 306 is supplied to a gain control terminal of the AGC amplifier 304 via a peak hold circuit 307. By this, the level of the output signal of BPF 306 is adjusted to be constant. A demodulator 308 demodulates the output signal of the BPF 306 and outputs it via an output circuit 309.

As shown in FIG. 5, since the plurality of condensers 303, 305 are provided between the photodiode 301 and the BPF 306, the DC component is completely removed. Namely, it is considered that the malfunction of the receiver is largely affected by an AC component of infrared rays emitted from the backlight 101.

Subsequently, the infrared radiation intensity of the backlight 101 when the malfunction duration time te shows a maximal value ($\Delta\theta=0°$) and when it shows a minimal value ($\Delta\theta=90°$) is described. In the following description, an intensity waveform of the infrared rays emitted from the fluorescent lamp is approximated as a sine curve.

Figure 6:
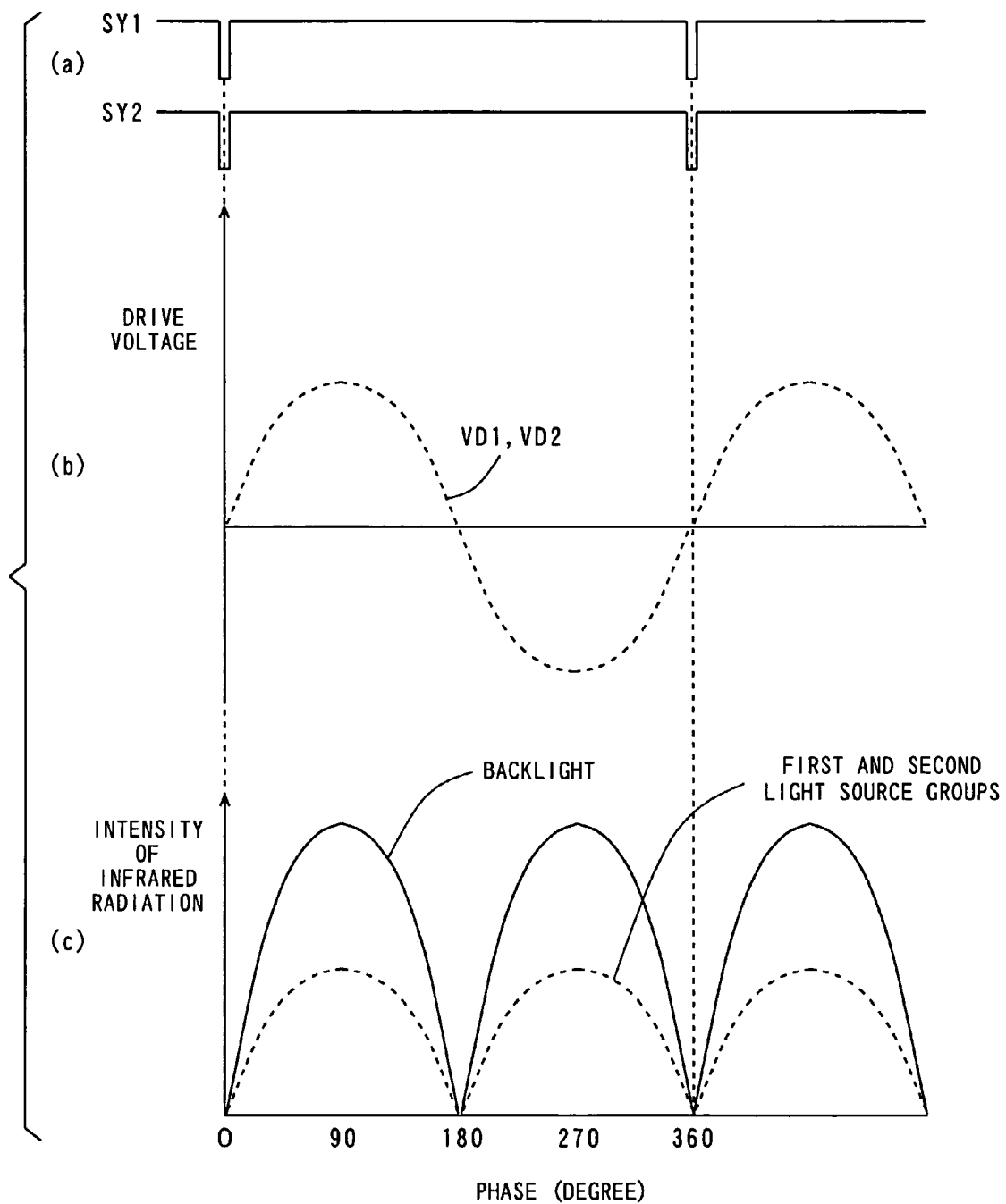
FIG. 6 is a chart showing a waveform of drive voltages, a waveform of the infrared radiation intensity of the first and second light source groups, and a waveform of the infrared radiation intensity of the backlight, when the phase difference Δθ between a synchronous signal SY1 and a synchronous signal SY2 is 0°.
Figure 7:
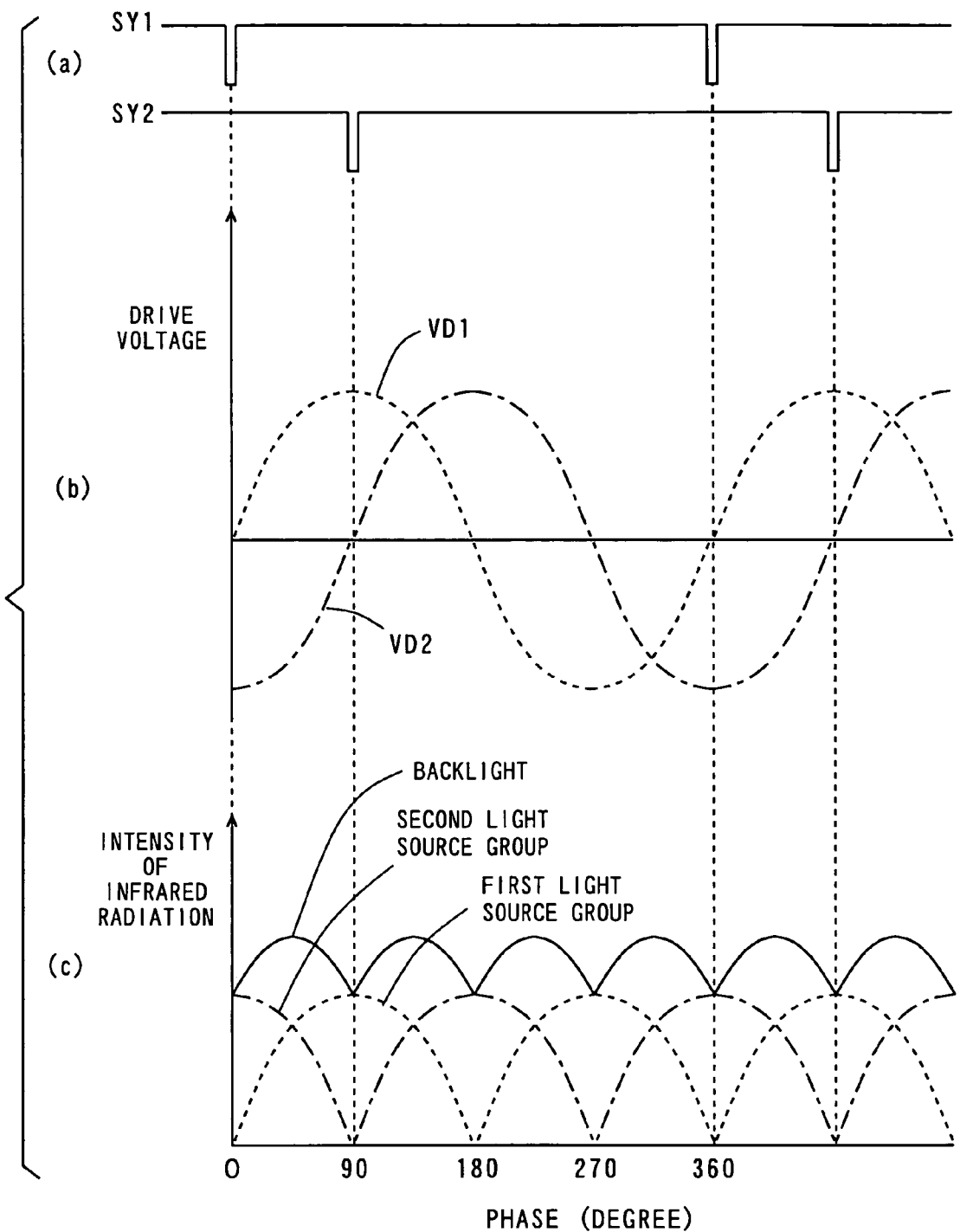
FIG. 7 is a chart showing waveforms of the drive voltages, waveforms of the infrared radiation intensity of the first and second light source groups, and a waveform of the infrared radiation intensity of the backlight, when the phase difference Δθ between the synchronous signal SY1 and the synchronous signal SY2 is 90°.

FIG. 6 is a chart showing a waveform of the drive voltages VD1, VD2, a waveform of the infrared radiation intensity of the first and the second light source groups 11, 12, and a waveform of the infrared radiation intensity of the backlight 101 when the phase difference $\Delta\theta$ between the synchronous signal SY1 and the synchronous signal SY2 is 0°. Furthermore, FIG. 7 is a chart showing waveforms of the drive voltages VD1, VD2, waveforms of the infrared radiation intensity of the first and the second light source groups 11, 12, and a waveform of the infrared radiation intensity of the backlight 101 when the phase difference $\Delta\theta$ between the synchronous signal SY1 and the synchronous signal SY2 is 90°. In FIGS. 6 and 7, the waveform of the infrared radiation intensity of the backlight 101 is a synthesized intensity waveform of the infrared radiation intensity of the first light source group 11 and the infrared radiation intensity of the second light source group 12.

When the phase difference $\Delta\theta$ between the synchronous signal SY1 and the synchronous signal SY2 is 0° as shown in FIG. 6(a), a phase difference $\Delta\theta$ between the drive voltage VD1 and the drive voltage VD2 is also 0 as shown in FIG. 6(b). In this case, as shown in FIG. 6(c), a phase difference $\Delta\theta$ between the infrared radiation intensity of the first light source group 11 and the infrared radiation intensity of the second light source group is also 0. Therefore, since the infrared radiation intensity of the first light source group 11 and the infrared radiation intensity of the second light source group 12 are synthesized so as to be intensified, an amplitude of the AC component of the waveform of infrared radiation intensity of the backlight 101 is increased. Thus, it is considered that an increase in amplitude of the AC component lengthens time when the malfunction of the receiver continues.

On the other hand, when the phase difference $\Delta\theta$ between the synchronous signal SY1 and the synchronous signal SY2 is 90° as shown in FIG. 7(a), the phase difference $\Delta\theta$ between the drive voltage VD1 and the drive voltage VD2 is also 90° as shown in FIG. 7(b). In this case, as shown in FIG. 7(c), the phase difference Δθ between the infrared radiation intensity of the first light source group 11 and the infrared radiation intensity of the second light source group is also 90°. Therefore, in the infrared radiation intensity of the backlight 101, although the DC component is superimposed on the AC component, the amplitude of the AC component is reduced to be small. Thus, it is considered that a reduction in the amplitude of the AC component shortens the time when the malfunction of the receiver continues.

When the phase difference Δθ is 180° and 360°, the same waveform of the infrared radiation intensity as in FIG. 6(c) appears and when the phase difference Δθ is 270°, the same waveform of infrared radiation intensity as in FIG. 7 (c) appears.

Accordingly, it is preferable that the phase difference Δθ between the synchronous signal SY1 and the synchronous signal SY2 is set within a range of 60° to 120° or a range of 240° to 300°. This can makes the malfunction duration time te shorter than the malfunction duration time te when the first light source group 11 and the second light source group 12 light asynchronously.

Furthermore, it is more preferable that the phase difference Δθ between the synchronous signal SY1 and the synchronous signal SY2 is set to a range of 75° to 105° or a range of 255° to 285°. This can make the malfunction duration time te sufficiently shorter. In addition, since the malfunction duration time comes in a start-up sequence of the display device with the backlight device, the display device, substantially, does not malfunction.

Still furthermore, it is the most preferable that the phase difference Δθ between the synchronous signal SY1 and the synchronous signal SY2 is set to 90° or 270°. This can makes the malfunction duration time te the shortest.

As described above, by setting the phase difference Δθ between the synchronous signal SY1 and the synchronous signal SY2 to the range of 60° to 120° or the range of 240° to 300°, the AC component in the waveform of the infrared radiation intensity of the backlight 101 can be reduced to be small. This can reduce the malfunction of the receiver.

SECOND EMBODIMENT

Figure 8:
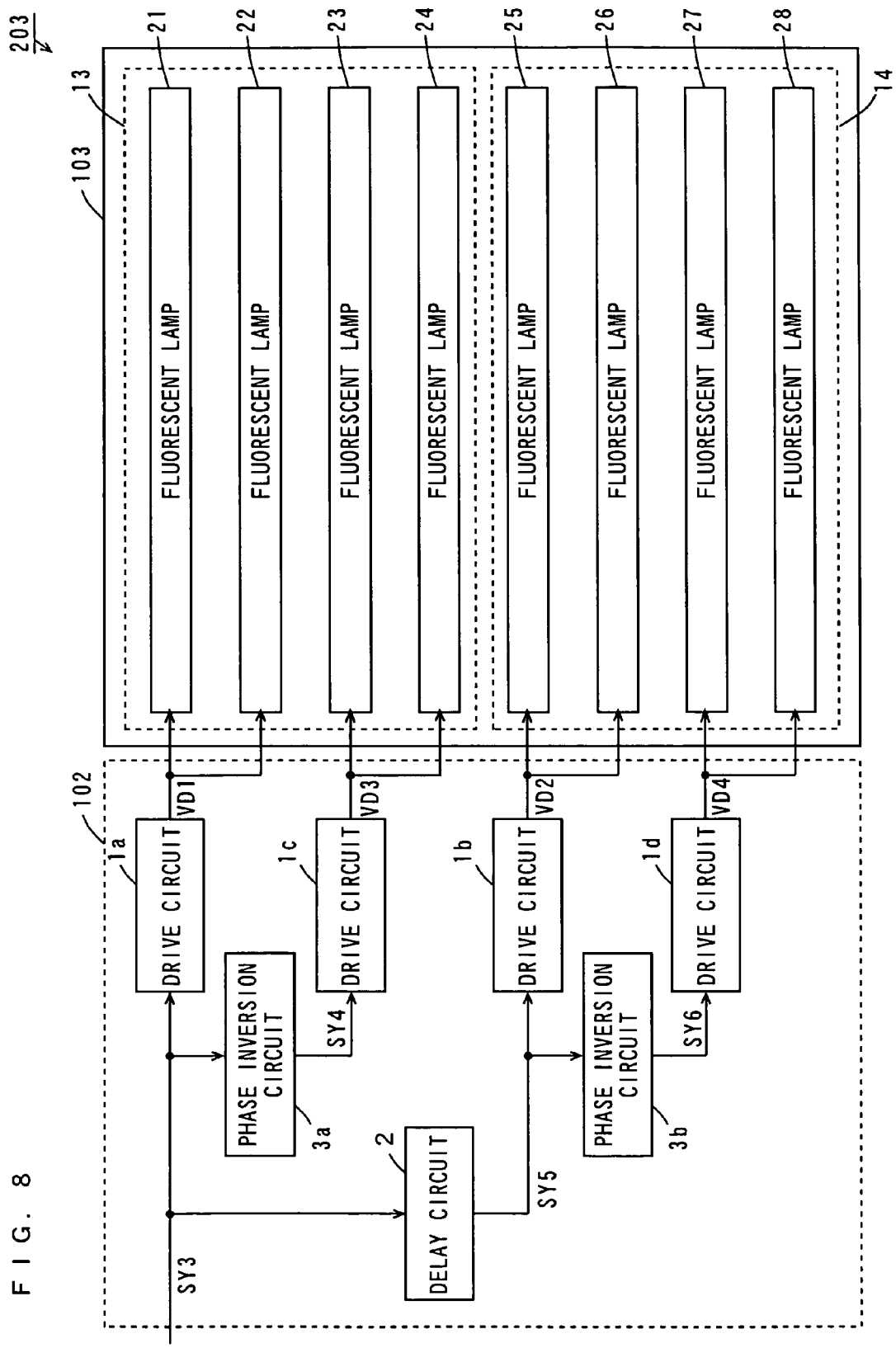
FIG. 8 is a block diagram showing a configuration of a backlight device according to a second embodiment of the present invention.

FIG. 8 is a block diagram showing a configuration of a backlight device according to a second embodiment of the present invention.

A backlight device 203 of FIG. 8 includes a drive unit 102 and a backlight 103. The drive unit 102 includes drive circuits 1a, 1b, 1c, 1d, the delay circuit 2, and phase inverting circuits 3a, 3b. The backlight 103 includes a first light source group 13 and a second light source group 14. Furthermore, the first light source group 13 includes fluorescent lamps 21 to 24 and the second light source group 14 includes fluorescent lamps 25 to 28.

In the liquid crystal display device, the backlight device 203 of FIG. 8 is provided on the back side of the liquid crystal panel 202 similar to the backlight device 201 of FIG. 2.

The synchronous signal SY3 is supplied to the drive circuit 1a and the delay circuit 2 of FIG. 8. The drive circuit 1a supplies the AC drive voltage VD1 to the fluorescent lamps 21, 22 synchronously with the synchronous signal SY3. By this, the fluorescent lamps 21, 22 light up. Further, the phase inverting circuit 3a supplies the drive circuit 1c a synchronous signal SY4 which is out of phase relative to the synchronous signal SY3 by 180°. The drive circuit 1c supplies an AC drive voltage VD3 to the fluorescent lamps 23, 24 synchronously with the synchronous signal SY4. By this, the fluorescent lamps 23, 24 light up.

Furthermore, the delay circuit 2 delays the phase of the synchronous signal SY3 as set in advance and supplies the delayed synchronous signal SY5 to the drive circuit 1b. The drive circuit 1b supplies the AC drive voltage VD2 to the fluorescent lamps 25, 26 synchronously with the synchronous signal SY5. By this, the fluorescent lamps 25, 26 light up. Further, the phase inverting circuit 3b supplies the drive circuit 1d a synchronous signal SY6 which is out of phase relative to the synchronous signal SY5 by 180°. The drive circuit 1d supplies an AC drive voltage VD4 to the fluorescent lamps 27, 28 synchronously with the synchronous signal SY6. By this, the fluorescent lamps 27, 28 light up. Here, a phase difference between the synchronous signal SY3 and the synchronous signal SY5 is Δθ.

Hereinafter, a waveform of the infrared radiation intensity of the backlight 103 when the phase difference Δθ between the synchronous signal SY3 and the synchronous signal SY5 is 90° is explained.

Figure 9:
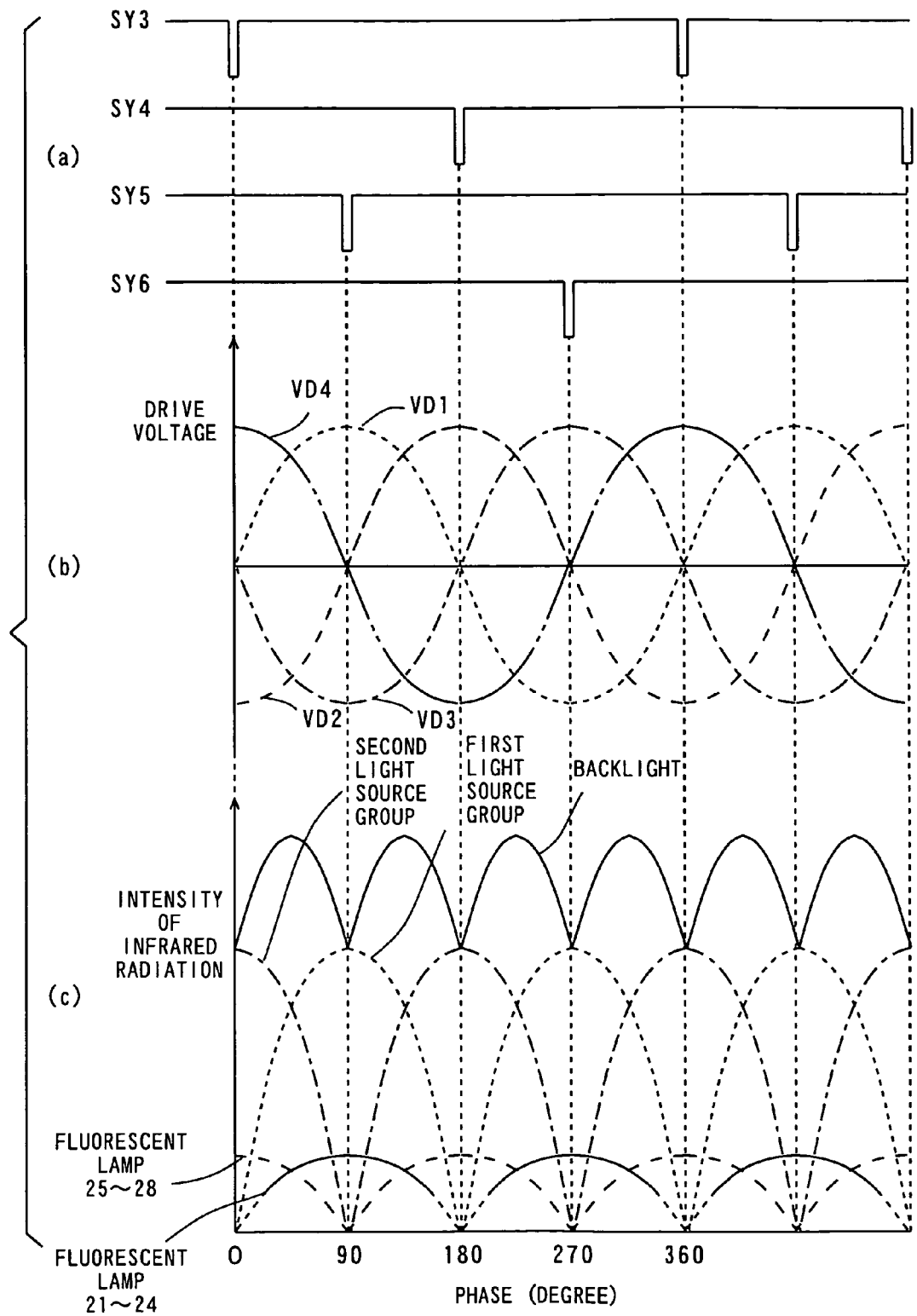
FIG. 9 is a chart showing waveforms of the drive voltages, waveforms of the infrared radiation intensity of fluorescent lamps, waveforms of the infrared radiation intensity of the first and second light source groups, and a waveform of the infrared radiation intensity of the backlight, when a phase difference Δθ between a synchronous signal SY3 and a synchronous signal SY5 is 90°.

FIG. 9 is a chart showing waveforms of the drive voltages VD1, VD2, VD3, VD4, and a waveform of the infrared radiation intensity of the fluorescent lamps 21 to 24, a waveform of the infrared radiation intensity of the fluorescent lamps 25 to 28, waveforms of the infrared radiation intensity of the first and second light source groups 13, 14, and a waveform of the infrared radiation intensity of the backlight 103, when the phase difference Δθ between the synchronous signal SY3 and the synchronous signal SY5 is 90°.

In FIG. 9, the waveform of the infrared radiation intensity of the first light source group 13 is a synthesized intensity waveform of the infrared radiation intensity of the fluorescent lamps 21 to 24, the waveform of the infrared radiation intensity of the second light source group 14 is a synthesized intensity waveform of the infrared radiation intensity of the fluorescent lamps 25 to 28, and the waveform of the infrared radiation intensity of the backlight 103 is a synthesized intensity waveform of the infrared radiation intensity of the first light source group 13 and the infrared radiation intensity of the second light source group 14.

In the configuration of FIG. 8, as shown in FIG. 9(b), the drive voltage VD3 is in opposite phase to the drive voltage VD1. Further, the phase difference Δθ between the drive voltage VD1 and the drive voltage VD2 becomes 90°, so that the drive voltage VD4 is in opposite phase to the drive voltage VD2.

In this case, the fluorescent lamps 21, 22 and the fluorescent lamps 23, 24 light synchronously with, and in opposite phase to each other. By this, the noise component caused from the respective fluorescent lamps in the first light source group 11 is cancelled. Also, in the second light source group 12, the fluorescent lamps 25, 26 and the fluorescent lamps 27, 28, light synchronously with, and in opposite phase to each other, so that the noise component caused from the respective fluorescent lamps is cancelled. As a result of the foregoing, the interference noise caused on the liquid crystal panel 202 can be reduced.

Furthermore, as shown in FIG. 9(c), the phase of the respective infrared radiation intensity of the fluorescent lamps 21 to 24 is identical, and the phase of the respective infrared radiation intensity of the fluorescent lamps 25 to 28 is also identical. Here, since the phase difference Δθ between the infrared radiation intensity of the fluorescents lamps 21 to 24 and the infrared radiation intensity of the fluorescents lamps 25 to 28 is 90°, the phase difference Δθ between the infrared radiation intensity of the first light source group 13 and the infrared radiation intensity of the second light source group 14 is also 90°. In this case, while the DC component is superimposed on the AC component in the infrared radiation intensity of the backlight 103, the amplitude of the AC component is reduced to be small. This can shorten the time when the malfunction of the receiver continues.

In the second embodiment, the relationship between the malfunction duration time te and the phase difference $\Delta\theta$ also meets the relationship shown in FIG. 4. Furthermore, when the phase difference $\Delta\theta$ is 270°, the same radiation intensity as in FIG. 9(c) appears.

Accordingly, it is preferable that the phase difference $\Delta\theta$ between the synchronous signal SY3 and the synchronous signal SY5 is set to a range of 60° to 120° or a range of 240° to 300°. This can makes the malfunction duration time te shorter than the malfunction duration time te when the first light source group 13 and the second light source group 14 light asynchronously.

Furthermore, it is more preferable that the phase difference $\Delta\theta$ between the synchronous signal SY3 and the synchronous signal SY5 is set to a range of 75° to 105° or a range of 255° to 285°. This can make the malfunction duration time te sufficiently shorter.

Furthermore, it is the most preferable that the phase difference $\Delta\theta$ between the synchronous signal SY3 and the synchronous signal SY5 is set to 90° or 270°. This can makes the malfunction duration time te the shortest.

As described above, by setting the phase difference $\Delta\theta$ between the synchronous signal SY3 and the synchronous signal SY5 within the range of 60° to 120° or the range of 240° to 300°, the AC component in the waveform of the infrared radiation intensity of the backlight 103 can be reduced to be small. This can reduce the malfunction of the receiver.

THIRD EMBODIMENT

Figure 10:
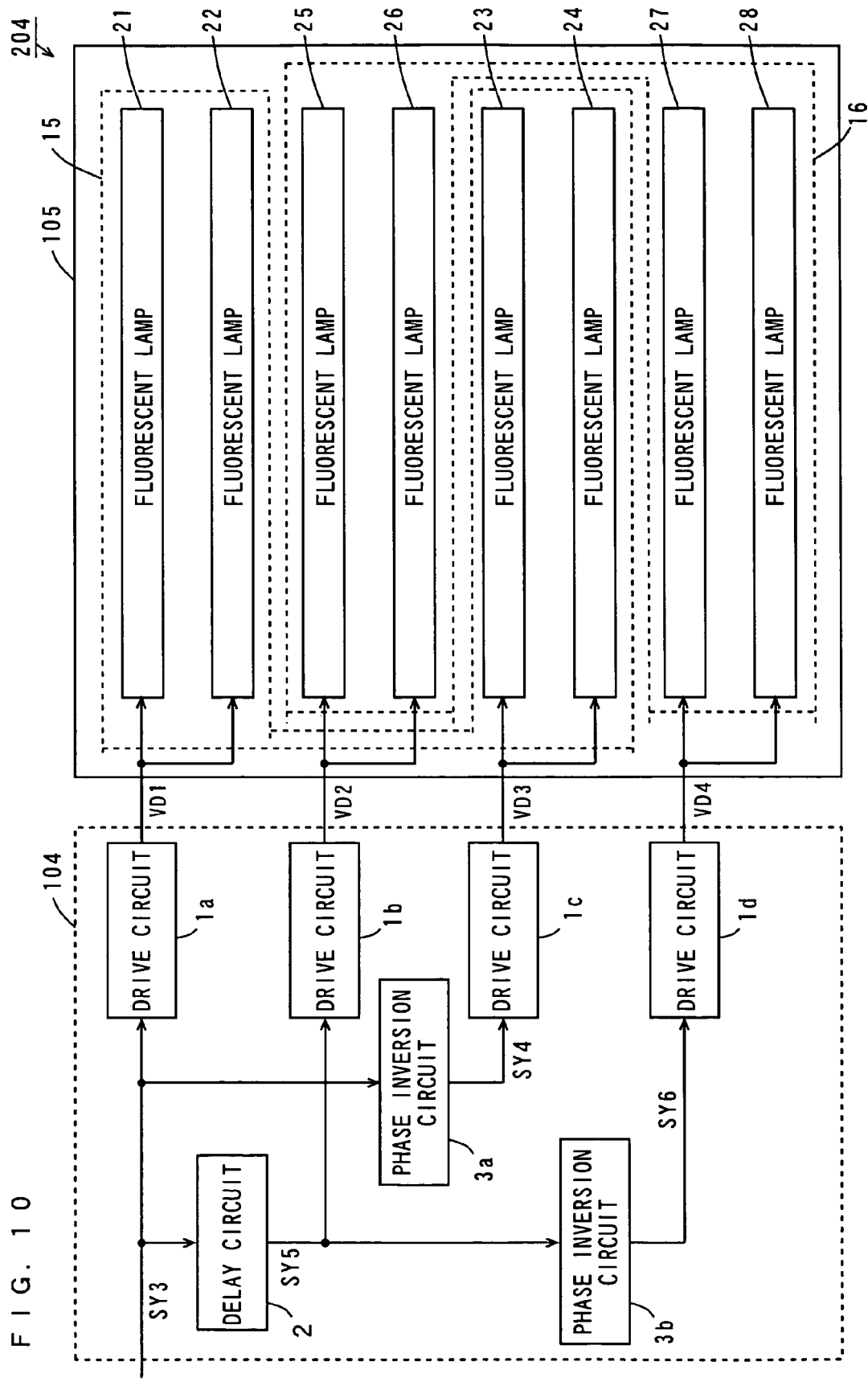
FIG. 10 is a block diagram showing a configuration of a backlight device according to a third embodiment of the present invention.

FIG. 10 is a block diagram showing a configuration of a backlight device according to a third embodiment of the present invention.

A backlight device 204 of FIG. 10 includes a drive unit 104 and a backlight 105. The drive unit 104 includes the drive circuits 1a, 1b, 1c, 1d, the delay circuit 2, and the phase inverting circuits 3a, 3b. The backlight 105 includes a first light source group 15 and a second light source group 16. Furthermore, the first light source group 15 includes the fluorescent lamps 21 to 24 and the second light source group 16 includes the fluorescent lamps 25 to 28.

The backlight device 204 of FIG. 10 is different from the backlight device 203 of FIG. 8 in the following points. In the backlight 105, the first light source group 15 is divided into a plurality of first subgroups and the second light source group 16 is divided into a plurality of second subgroups. The plurality of first subgroups and the plurality of second subgroups are arranged alternately. The fluorescent lamps 21, 22 form one of the first subgroups and the fluorescent lamps 23, 24 form the other first subgroup. Further, the fluorescent lamps 25, 26 form one of the second subgroups and the fluorescent lamps 27, 28 form the other second subgroup.

Thus, the fluorescent lamps 25, 26 of the second light source group 16 are arranged next to the fluorescent lamps 21, 22 of the first light source group 15, the fluorescent lamps 23, 24 of the first light source group 15 are arranged next to the fluorescent lamps 25, 26 on opposite side of the fluorescent lamps 21, 22, and the fluorescent lamps 27, 28 of the second light source group 16 are arranged next to the fluorescent lamps 23, 24 on opposite side of the fluorescent lamps 25, 26.

In this case, a waveform of the infrared radiation intensity of the backlight 105 is the same as the waveform of the infrared radiation intensity of the backlight 103 in the second embodiment, but since the first subgroups of the first light source group 15 and the second subgroups of the second light source group 16 are arranged alternately, infrared rays emitted from the first light source group 15 and infrared rays emitted from the second light source group 16 are synthesized at a short distance. By this, the effect described in FIG. 9 becomes more remarkable. As a result, the malfunction of the receiver of the remote controlling equipment can be further reduced.

FOURTH EMBODIMENT

Figure 11:
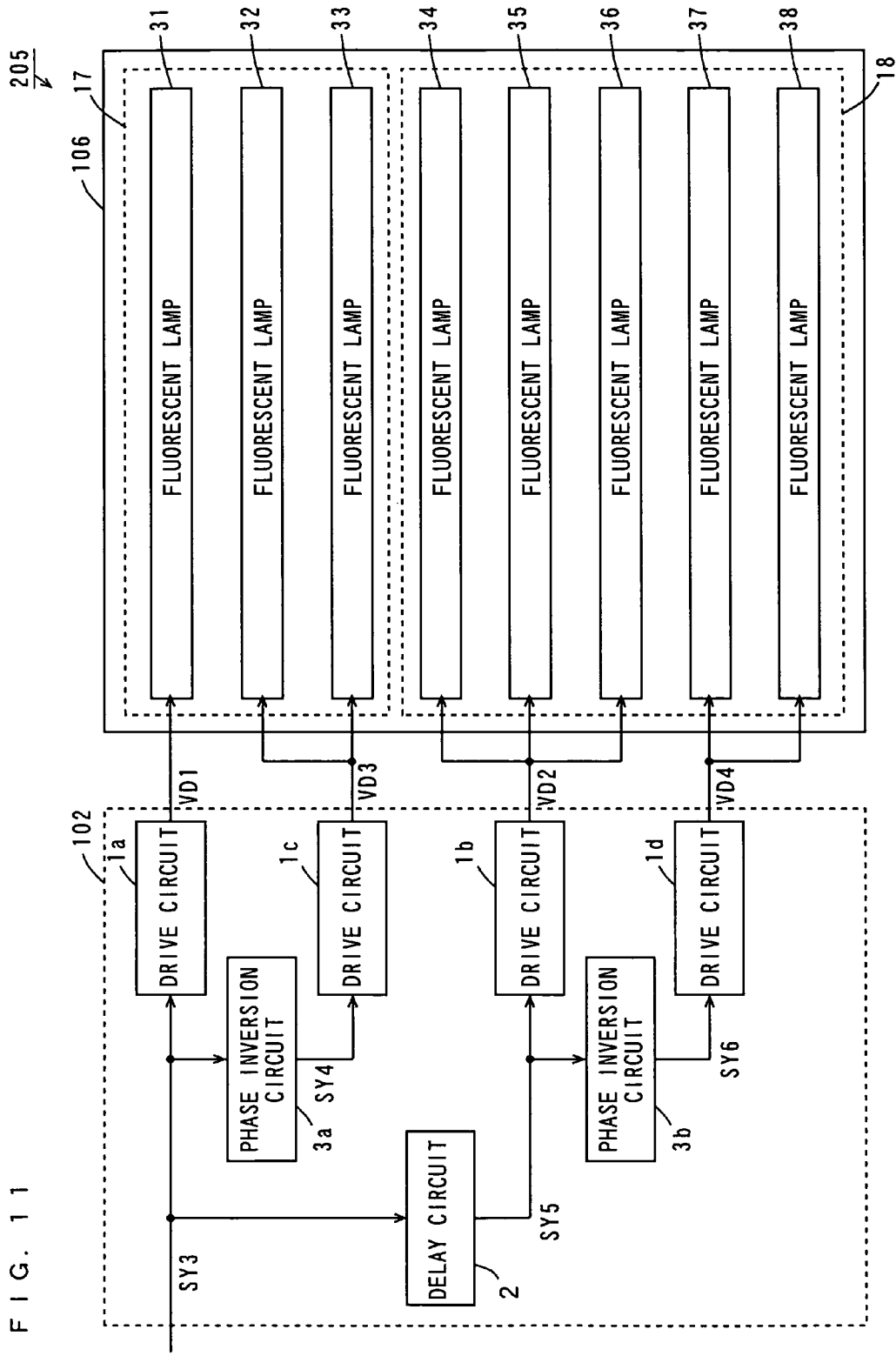
FIG. 11 is a block diagram showing a configuration of a backlight device according to a fourth embodiment of the present invention.

FIG. 11 is a block diagram showing a configuration of a backlight device according to a fourth embodiment of the present invention.

A backlight device 205 of FIG. 11 includes the drive unit 102 and a backlight 106. The drive unit 102 includes the drive circuits 1a, 1b, 1c, 1d, the delay circuit 2, and the phase inverting circuits 3a, 3b. The backlight 106 includes a first light source group 17 and a second light source group 18. Furthermore, the first light source group 17 includes fluorescent lamps 31 to 33 and the second light source group 18 includes fluorescent lamps 34 to 38.

The difference of the backlight device 205 of FIG. 11 from the backlight device 203 of FIG. 8 is that in the backlight 106, the first light source group 17 includes the fluorescent lamps 31 to 33 and the second light source group 18 includes the fluorescent lamps 34 to 38. Namely, in the backlight device 205 of FIG. 11, the second light source group 18 includes more fluorescent lamps than the first light source group 17. In such a configuration, by setting the phase difference $\Delta\theta$ between the synchronous signal SY3 and the synchronous signal SY5 to a range of 60° to 120° or a range of 240° to 300°, the AC component in the waveform of the infrared radiation intensity of the backlight 106 can be also reduced to be small. By this, the malfunction of the receiver can be reduced.

OTHER EMBODIMENTS

While in the above-described first to fourth embodiments, the direct backlight device is described, the above-described configurations may be applied to an edge type backlight device.

FIG. 12(a) is a schematic plane view of a liquid crystal display device using an edge type backlight device with straight tube lamps and FIG. 12(b) is a cross-section view taken along A-A line in FIG. 12(a).

Furthermore, FIG. 13(a) is a schematic plane view of a liquid crystal display device using an edge type backlight device with L-shaped lamps, and FIG. 13(b) is a cross-section view taken along A-A line in FIG. 13(a).

Figure 12:
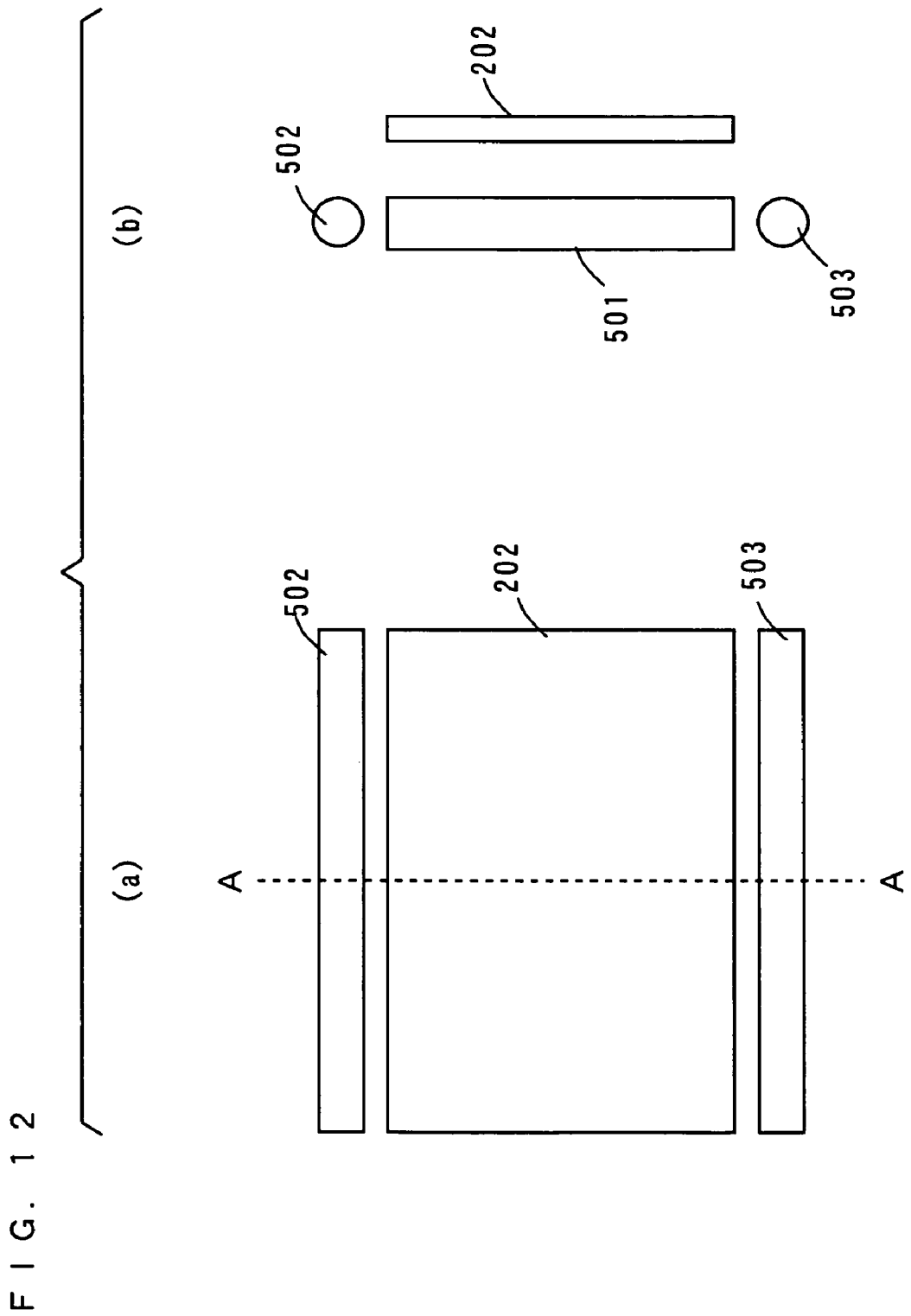
FIG. 12 is a schematic plane view of a liquid crystal display device using an edge type backlight device with straight tube lamps.

The liquid crystal display device of FIG. 12 includes the liquid crystal panel 202, a light guide plate 501, and straight tube lamps 502, 503. The straight tube lamp 502 is provided on one side of the light guide plate 501 and the straight tube lamp 503 is provided on the other side of the light guide plate 501.

Figure 13:
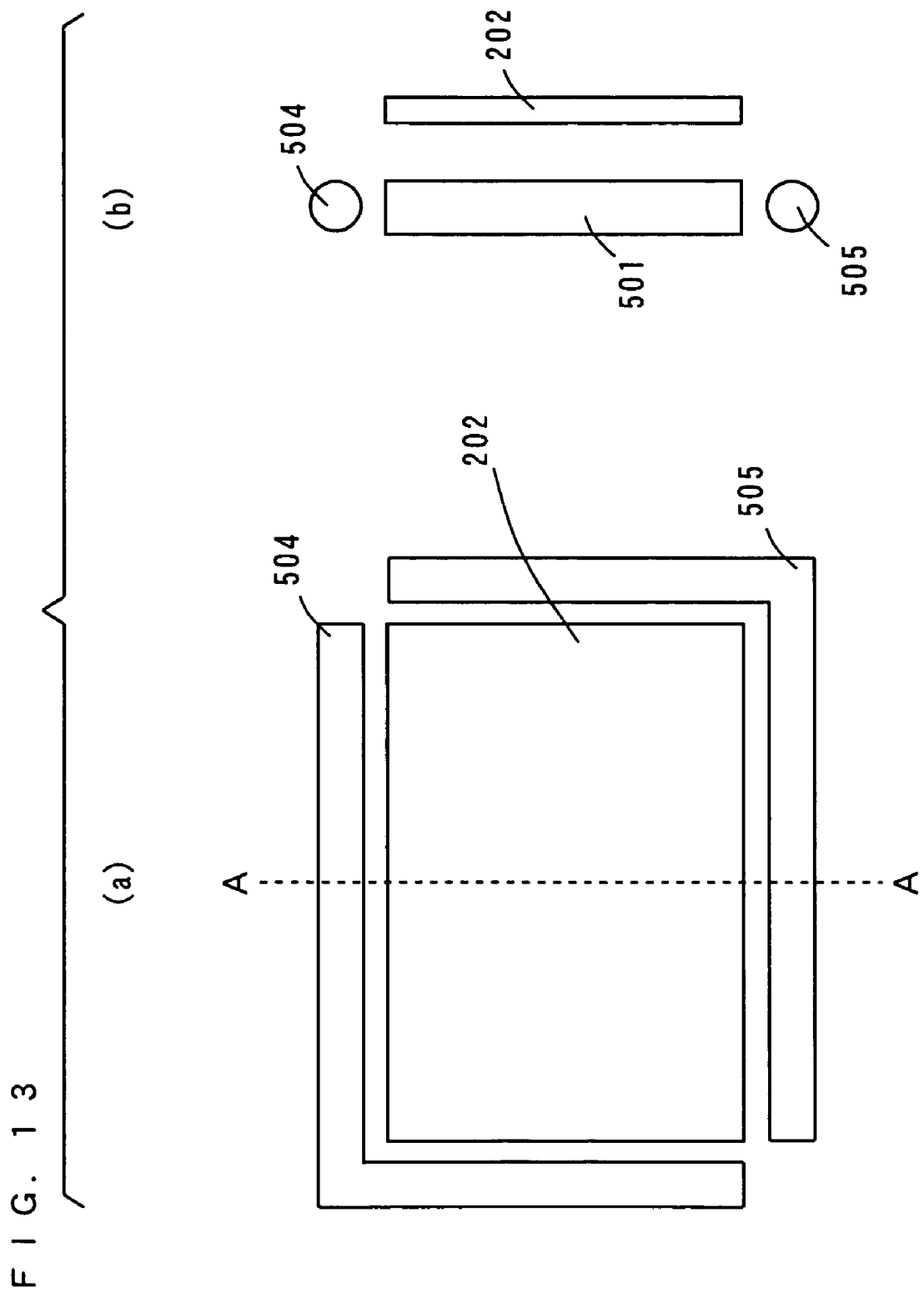
FIG. 13 is a schematic plane view of a liquid crystal display device using an edge type backlight device with L-shaped lamps.

Furthermore, the liquid crystal display device of FIG. 13 includes the liquid crystal panel 202, the light guide plate 501 and L-shaped lamps 504, 505. The L-shaped lamp 504 is provided so as to cover one side in a long edge direction of the light guide plate 501 and one side in a short edge direction thereof and the L-shaped lamp 505 is provided so as to cover the other side in the long edge direction of the light guide plate 501 and the other side in the short edge direction thereof.

In the liquid crystal display device of FIGS. 12 and 13, light generated by the straight tube lamps 502, 503 and the L-shaped lamps 504, 505 enters the light guide plate 501. The light entering the light guide plate 501 is caused to reflect so as to irradiate the whole liquid crystal panel 202 uniformly by reflecting dots (not shown) or reflecting grooves (not shown), which are provided in the light guide plate 501. By this, the display of the liquid crystal panel 202 is performed.

Here, the straight tube lamp 502 and the L-shaped lamp 504 are driven by the drive circuit 1a of FIG. 1, and the straight tube lamp 503 and the L-shaped lamp 505 are driven by the drive circuit 1b of FIG. 1. By this, an effect similar to the effect obtained in the above-described first embodiment can be obtained.

Furthermore, in the above-described configurations, since in the light guide plate 501, the infrared rays emitted by the straight tube lamps 502, 503 and the L-shaped lamps 504, 505 are synthesized more uniformly, the effect described in FIG. 7 becomes more remarkable. By this, the malfunction of the receiver of the remote controlling equipment can be sufficiently reduced.

In place of the delay circuit 2 in the above-described embodiments, a phase shifter that shifts the phase using another analog circuit such as a PLL (Phase Locked Loop) circuit and a filter circuit may be configured.

In the above-described embodiments, the synchronous signal SY1 and the synchronous signal SY3 each correspond to a first synchronous signal, the synchronous signal SY2 and the synchronous signal SY5 each correspond to a second synchronous signal, the synchronous signal SY4 corresponds to a third synchronous signal, and the synchronous signal SY6 corresponds to a fourth synchronous signal.

Furthermore, the drive voltage VD1 corresponds to a first drive voltage, the drive voltage VD2 corresponds to a second drive voltage, the drive voltage VD3 corresponds to a third drive voltage, the drive voltage VD4 corresponds to a fourth drive voltage, the drive circuit 1a corresponds to a first drive circuit, the drive circuit 1b corresponds to a second drive circuit, the drive circuit 1c corresponds to a third drive circuit, and the drive circuit 1d corresponds to a fourth drive circuit.

Furthermore, the delay circuit 2 corresponds to a first signal generating circuit, the phase inverting circuit 3a corresponds to a second signal generating circuit, and the phase inverting circuit 3b corresponds to a third signal generating circuit.

The invention claimed is:

1. A backlight device comprising:
a first light source group including one or more light sources that emit visible light and infrared rays;
a second light source group including one or more light sources that emit visible light and infrared rays; and
a drive unit that drives the one or more light sources of said first light source group in response to a first synchronous signal and drives the one or more light sources of said second light source group in response to a second synchronous signal, wherein
a phase difference between said first synchronous signal and said second synchronous signal is within a range larger than 60 degrees and smaller than 120 degrees or a range larger than 240 degrees and smaller than 300 degrees.

2. The backlight device according to claim 1, wherein each of the one or more light sources of said first light source group and the one or more light sources of said second light source group is a fluorescent lamp.

3. The backlight device according to claim 1, wherein
said first light source group includes a plurality of light sources, and
said drive unit drives a part of said plurality of light sources of said first light source group in response to said first synchronous signal, and drives the rest of said plurality of light sources of said first light source group in response to a third synchronous signal having a different phase from that of said first synchronous signal by half a period.

4. The backlight device according to claim 3, wherein
said second light source group includes a plurality of light sources, and
said drive unit drives a part of said plurality of light sources of said second light source group in response to said second synchronous signal, and drives the rest of said plurality of light sources of said second light source group in response to a fourth synchronous signal having a different phase from that of said second synchronous signal by half a period.

5. The backlight device according to claim 1, wherein
said first light source group includes a plurality of light sources and the plurality of light sources of said first light source group is divided into a plurality of first subgroups, and
said plurality of first subgroups and said second light source group are arranged alternately.

6. The backlight device according to claim 5, wherein
said second light source group includes a plurality of light sources, and the plurality of light sources of said second light source group are divided into a plurality of second subgroups, and
said plurality of first subgroups and said second subgroups are arranged alternately.

7. The backlight device according to claim 1, wherein the phase difference between said first synchronous signal and said second synchronous signal is within a range of 75 degrees to 105 degrees or a range of 255 degrees to 285 degrees.

8. The backlight device according to claim 1, wherein the phase difference between said first synchronous signal and said second synchronous signal is substantially 90 degrees or 270 degrees.

9. The backlight device according to claim 1, wherein
said drive unit includes:
a first drive circuit that applies a first drive voltage to said one or more light sources of said first light source group synchronously with said first synchronous signal; and
a second drive circuit that applies a second drive voltage to said one or more light sources of said second light source group synchronously with said second synchronous signal.

10. The backlight device according to claim 9, wherein said drive unit further includes a first signal generating circuit that generates said second synchronous signal based on said first synchronous signal.

11. The backlight device according to claim 3, wherein
said drive unit includes:
a first drive circuit that applies a first drive voltage to said part of said plurality of light sources of said first light source group synchronously with said first synchronous signal;
a second drive circuit that applies a second drive voltage to said one or more light sources of said second light source group synchronously with said second synchronous signal; and a third drive circuit that applies a third drive voltage to said rest of said plurality of light sources of said first light source group synchronously with said third synchronous signal.

12. The backlight device according to claim 11, wherein said drive unit further includes:
a first signal generating circuit that generates said second synchronous signal based on said first synchronous signal; and
a second signal generating circuit that generates said third synchronous signal based on said first synchronous signal.

13. The backlight device according to claim 4, wherein said drive unit includes:
a first drive circuit that applies a first drive voltage to said part of said plurality of light sources of said first light source group synchronously with said first synchronous signal;
a second drive circuit that applies a second drive voltage to said part of said plurality of light sources of said second light source group synchronously with said second synchronous signal;
a third drive circuit that applies a third drive voltage to said rest of said plurality of light sources of said first light source group synchronously with said third synchronous signal; and
a fourth drive circuit that applies a fourth drive voltage to said rest of said plurality of light sources of said second light source group synchronously with said fourth synchronous signal.

14. The backlight device according to claim 13, wherein said drive unit further includes:
a first signal generating circuit that generates said second synchronous signal based on said first synchronous signal;
a second signal generating circuit that generates said third synchronous signal based on said first synchronous signal; and
a third signal generating circuit that generates said fourth synchronous signal based on said second synchronous signal.

15. The backlight device according to claim 1, wherein the number of said one or more light sources of said first light source group and the number of said one or more light sources of said second light source group are equal.

16. The backlight device according to claim 1, wherein said one or more light sources of said first light source group and said one or more light sources of said second light source group are straight tube lamps or L-shaped lamps.

17. The backlight device according to claim 16, further comprising:
a light guide plate, wherein
said straight tube lamps or L-shaped lamps are arranged on the side of said light guide plate.

18. A display device comprising:
a display panel that displays an image; and
a backlight device arranged on the back side of said display panel, wherein
said backlight device includes:
a first light source group including one or more light sources that emit visible light and infrared rays;
a second light source group including one or more light sources that emit visible light and infrared rays; and
a drive unit that drives the one or more light sources of said first light source group in response to a first synchronous signal and drives the one or more light sources of said second light source group in response to a second synchronous signal, and wherein
a phase difference between said first synchronous signal and said second synchronous signal is within a range larger than 60 degrees and smaller than 120 degrees or a range larger than 240 degrees and smaller than 300 degrees.

19. The display device according to claim 18, wherein said display panel is a liquid crystal display panel.

* * * * *